United States Patent
S

(12) 
(10) Patent No.: US 11,086,828 B2
(45) Date of Patent: Aug. 10, 2021

(54) COMPRESSION OF COLUMN STORE TABLES

(71) Applicant: SAP SE, Walldorf (DE)

(72) Inventor: Anbusivam S, Bangalore (IN)

(73) Assignee: SAP SE, Walldorf (DE)

(*) Notice: Subject to any disclaimer, the term of this patent is extended or adjusted under 35 U.S.C. 154(b) by 129 days.

(21) Appl. No.: 16/158,496

(22) Filed: Oct. 12, 2018

(65) Prior Publication Data

US 2020/0117726 A1 Apr. 16, 2020

(51) Int. Cl.
*G06F 16/21* (2019.01)
*G06F 16/22* (2019.01)
*G06F 16/2455* (2019.01)

(52) U.S. Cl.
CPC .......... *G06F 16/211* (2019.01); *G06F 16/221* (2019.01); *G06F 16/2282* (2019.01); *G06F 16/24556* (2019.01)

(58) Field of Classification Search
CPC .. G06F 16/211; G06F 16/221; G06F 16/4556; G06F 16/2282; G06F 16/24556
See application file for complete search history.

(56) References Cited

U.S. PATENT DOCUMENTS

| | | | |
|---|---|---|---|
| 2008/0294676 A1* | 11/2008 | Faerber | G06F 16/2455 |
| 2014/0304275 A1* | 10/2014 | Baskett | G06F 16/221 |
| | | | 707/747 |
| 2017/0109386 A1* | 4/2017 | Baer | G06F 16/24554 |
| 2017/0109421 A1* | 4/2017 | Steam | G06F 16/951 |
| 2017/0116242 A1* | 4/2017 | Chavan | G06F 12/0875 |
| 2017/0177604 A1* | 6/2017 | Geissinger | G06F 8/4434 |
| 2018/0089261 A1* | 3/2018 | Li | G06F 16/23 |
| 2018/0150494 A1* | 5/2018 | Schulze | G06F 16/2228 |
| 2019/0018851 A1* | 1/2019 | Shimizu | G06F 16/113 |
| 2019/0155930 A1* | 5/2019 | Fender | G06F 16/2282 |
| 2019/0391978 A1* | 12/2019 | Liu | G06F 16/221 |

\* cited by examiner

*Primary Examiner* — Cam Y T Truong
(74) *Attorney, Agent, or Firm* — Buckley Maschoff & Talwalker LLC

(57) ABSTRACT

A method and system including a common dictionary module; a common dictionary processor in communication with the common dictionary module and operative to execute processor-executable process steps to cause the system to: define a common dictionary type; assign one or more characteristics to the common dictionary type; receive one or more data values; compress the dictionary type; and generate a common dictionary. Numerous other aspects are provided.

11 Claims, 8 Drawing Sheets

600

```
☐ COLUMN TABLE CREATION                                    ☐☐☒
File Edit View Favorites Tools Help
⇐Back ▾ ⇒ ▾ ⊗ ▯ ⚐ | ⌕Search ★Favorites ⌖Media ⌘ | ▤▾ ⌸ ▦ ▤
Address ▯                                                      ▾ ▯ Go COLUMN TABLE CREATION
     CREATE COLUMN DICTIONARY TYPE "COUNTRY_DICT" VARCHAR(50);

CREATE COLUMN TABLE "ADDRESS_INFO"( ⎫
        602 ⎯ "NAME" VARCHAR(60),         ⎬ ⎯ 604
             "STREET" VARCHAR(100), ⎯ 404 ⎪
             "COUNTRY" COUNTRY_DICT);     ⎭

CREATE COLUMN TABLE "SALES_INFO"(
             "COUNTRY" COUNTRY_DICT;
             "SALES_VOLUME" FLOAT);
```

COMPRESSION OF COLUMN STORE TABLES

BACKGROUND

In a column-store database, a database table column may be associated with a dedicated dictionary of unique values. The dictionary includes a list of the distinct values stored within the rows of the column. Accordingly, the value of any row of the column may be stored in memory by simply storing an index pointing to the location of the value within the dictionary.

Often in a software application multiple dictionaries may include same information, since the same information may be used across multiple database table columns. For example, a particular customer's name may appear in both an order database table and a shipping database table. The redundancy in data causes the dictionaries corresponding to the columns to occupy a larger memory footprint than might otherwise be necessary and may result in longer processing times. Dictionary compression may be one of several compression techniques used in column-store databases for reducing the memory footprint.

Systems and methods are desired which support efficient de-duplication of a dictionary.

DETAILED DESCRIPTION

The following description is provided to enable any person in the art to make and use the described embodiments and sets forth the best mode contemplated for carrying out some embodiments. Various modifications, however, will remain readily apparent to those in the art.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Figure 1:
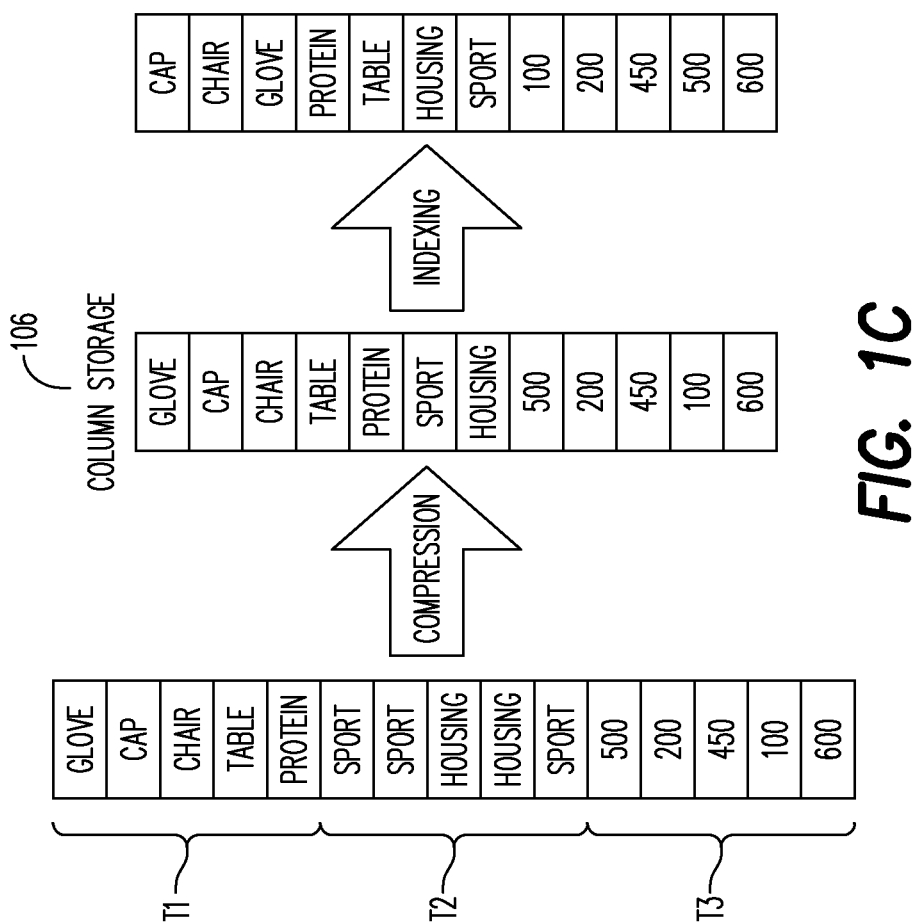
FIG. 1 is a block diagram according to some embodiments.

A common way of storing data in a database is in the form of a table. For example, FIG. 1A provides a logical table structure 102. In some instances, table storage in a database is generally a row store, where each row of data is stored one after the other in a sequence, as shown in the row storage 104 in FIG. 1B. However, with row storage to read one column of the database table 102, the entire data array 104 may be analyzed. For example, to read the "Material" column of the table 102, with the row storage, the entire storage may be read.

Some databases support another additional form of storage called column store 106. In column store, each column in the table 102 acts as an individual table, and gets stored separately, as shown in FIG. 1C, and indicated by T1, T2, T3. Each of these individual tables may be indexed (e.g. sorted, to find data faster) and compressed (e.g., a process of removing duplicates, to save disk space). Compression may make sure that each of these individual tables only contains a unique entry. A non-exhaustive example of a compression process includes dictionary compression. With dictionary compression, the duplicates may be removed first, and then coded values may be substituted (often an integer which is smaller in size than the actual value, but other values may be used), instead of storing the bigger actual value in the table. It is noted that dictionary compression may be applied to a column in a table, and the "dictionary" itself is the compression.

Irrespective of the type of storage (row or column), a dictionary may be generated for each database table, and more particularly the dictionary is created for each column of a table in a database. As described above, a database table column may be associated with a dedicated dictionary. The dictionary includes a list of the distinct values stored within the rows of the column. Accordingly, the value of any row of the column may be stored in memory by simply storing an index pointing to the location of the value within the dictionary.

Figure 2:
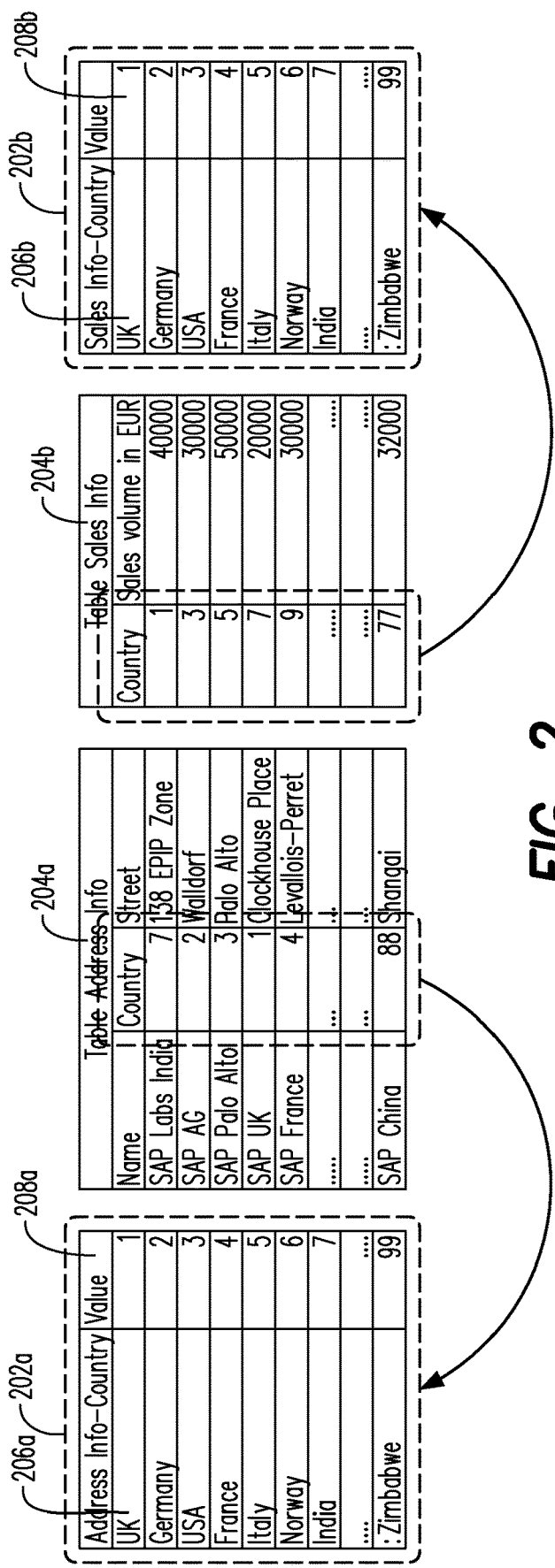
FIG. 2 includes prior art tables.
Figure 3:
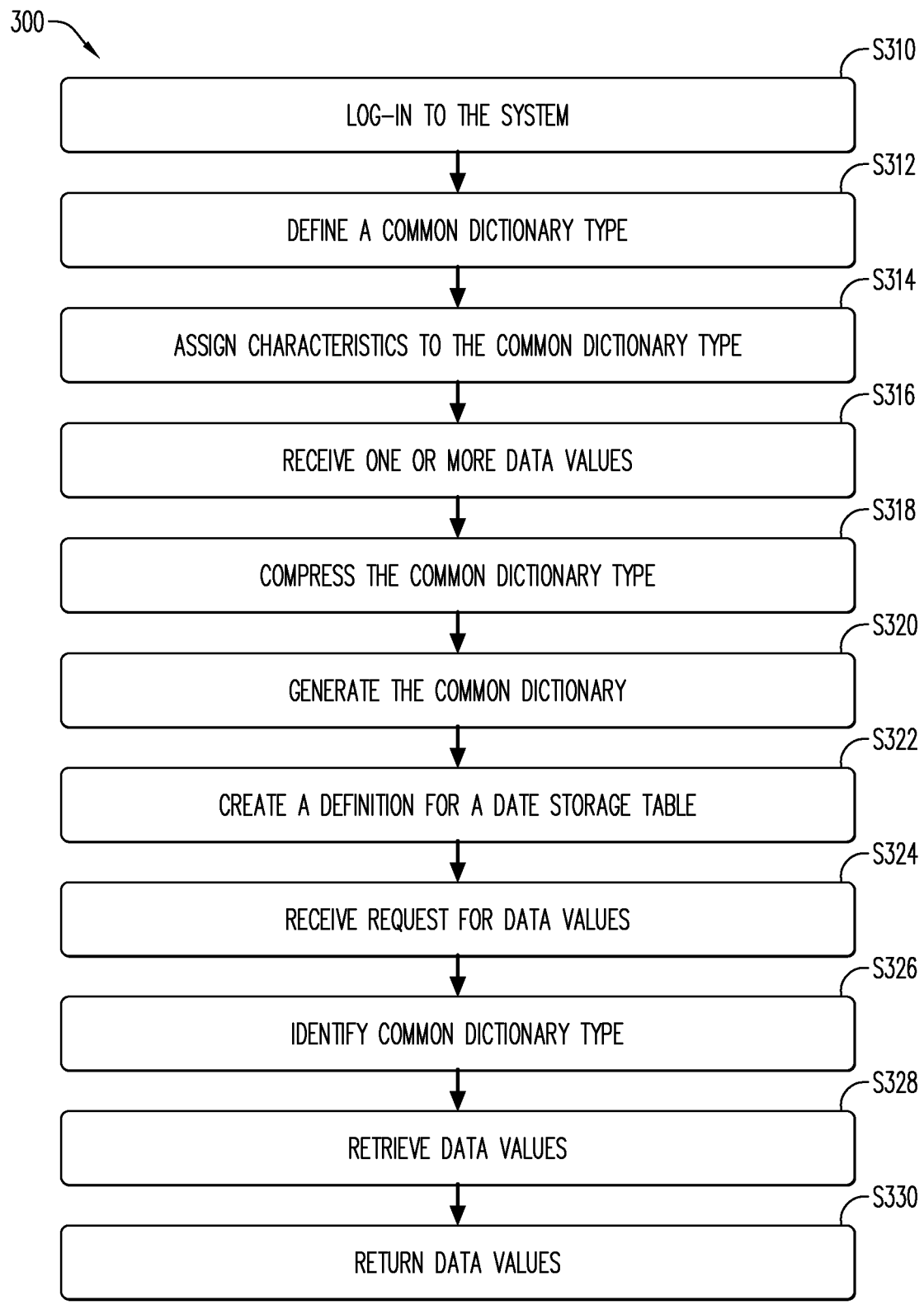
FIG. 3 is a flow diagram according to some embodiments.

Turning to FIG. 2 a prior art dictionary 202 is provided for a column in a table 204. As shown herein, the table 204 may be a column store. The dictionary 202 may have been compressed, based on one column. Dictionary compression may be one of several compression techniques used in column-store databases for reducing the memory footprint. As a first step in dictionary compression, any redundancies are removed. Then, dictionary compression may involve the mapping of distinct column values from the table 204 to consecutive numbers, so that instead of the actual value being stored, the typically much smaller consecutive number is stored. As shown herein in the non-exhaustive examples, for a first dictionary 202a, the "Country" column from the first table 204a ("Table Address Info") has been compressed, and the "UK" actual value 206a in the first dictionary 202a has been given an assigned value 208a of "1". Then, in the first table 204, in the "Country" column, the actual value 206a (e.g., "UK") has been replaced by the assigned value "1". Similarly, for the second dictionary 202b, the "Country" column from the second table 204b ("Table Sales Info") has been compressed, and the "UK" actual value 206b in the second dictionary 202b has been given an assigned value 208b of "1".

It is noted that using the assigned value, in the table, where the assigned value is output by the compression process, may occupy less storage space in memory than using the actual value in storage. It is further noted that while the columns are compressed and using less storage than if not compressed, there may still be additional overhead. For example, though the meaning of a column, including the defined relationship, is the same for multiple tables, the dictionary may be stored multiple times. In the example shown in FIG. 2, while the first dictionary 202a and the second dictionary 202b are the same, they are each stored as the dictionary for their respective columns in table 204a and 204b. It is noted that the redundancy in the data causes the dictionaries corresponding to the columns to occupy a larger memory footprint than might otherwise be necessary. Additionally, as each dictionary is compressed, having multiple dictionaries with the same data may result in additional processing overhead on compression.

Embodiments provide a common dictionary module for generating and defining a common dictionary type for a database, where the one common dictionary may be used by multiple tables. In one or more embodiments, the columns in the tables may specify a dictionary type instead of a direct column datatype. As such, all the columns having a same dictionary type may share the common dictionary instead of each having their own dictionary. The inventor notes that by using a common dictionary, the memory footprint may be reduced, as well as the process overhead on compression when there are same column types used in multiple column tables. Additionally, one or more embodiments provide that any updates to the dictionary may be in a single location (i.e. the common dictionary), instead of having to update the conventional individual dictionaries, which may save time and reduce errors.

FIGS. 3-7 include a flow diagram of a process 300 (FIG. 3) for generating a common dictionary according to some embodiments. Process 300 may be executed by application server 730 or DBMS 720 according to some embodiments. In one or more embodiments, the application server 730 or DBMS 720 may be conditioned to perform the process 300, such that a processor 810 (FIG. 8) of the system 700 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

User interface 600 (FIG. 6) may be presented on any type of display apparatus (e.g., desktop monitor, smartphone display, tablet display) provided by any type of device (e.g., desktop system, smartphone, tablet computer). One or more embodiments may include a UI renderer (not shown) which is executed to provide user interface 600 and may comprise a Web Browser, a standalone application, or any other application. Embodiments are not limited to user interface 600 of FIG. 6.

Initially, at S310, a user logs into a system 700 (FIG. 7) to create a common dictionary 402. The common dictionary 402 may be a table that stores information about user-defined objects in columns in one or more database tables. It is noted that there may be a common dictionary for a single table. As a non-exhaustive example, in a case of shipping there may be a source country and a target country. Both are country columns and may belong to a same table. When an application is executed, it will return one or more data values, which may be stored in the one or more database tables. Each of the database tables may be an in-memory database that stores all of its data online or in its memory, or any other suitable database. In one or more embodiments, the user may be an application developer, system administrator, end user of any other type, or another application.

Then in S312, a common dictionary type 404 is defined. In one or more embodiments, the dictionary type may be introduced as an object in a database platform. As used herein, "dictionary type" may refer to a field that may describe the category of data values in a given column of a database table 406. The dictionary type may have the potential to be used in multiple database tables. In one or more embodiments, the common dictionary type may correspond to a column heading from a yet to be created database table. While the non-exhaustive examples included herein describe the common dictionary being created before creation of the database table, in one or more embodiments, a DBMS system may create the common dictionary after creation of the database table. As non-exhaustive examples, dictionary type may be Country, BusinessPartnerID, ProductID, BusinessPartnerExternalID, etc. For each defined common dictionary type 404, one or more characteristics 604 (FIG. 6) are assigned to the common dictionary type in S314 to define the structure for the values that will be stored in the common dictionary. The characteristics may include data type, size, decimals, a label or description, nullable indicator (e.g., nullable or not), unique indicator (e.g., unique or not), a list of possible value ranges, encoding (e.g., Unicode, ANSI, etc.) etc. Other suitable characteristics may be used.

Next, the common dictionary 402 receives one or more data values 408 in S316. In one or more embodiments the data values 408 may be received by user-entry, another application or system, or any other suitable data value source.

Figure 4:
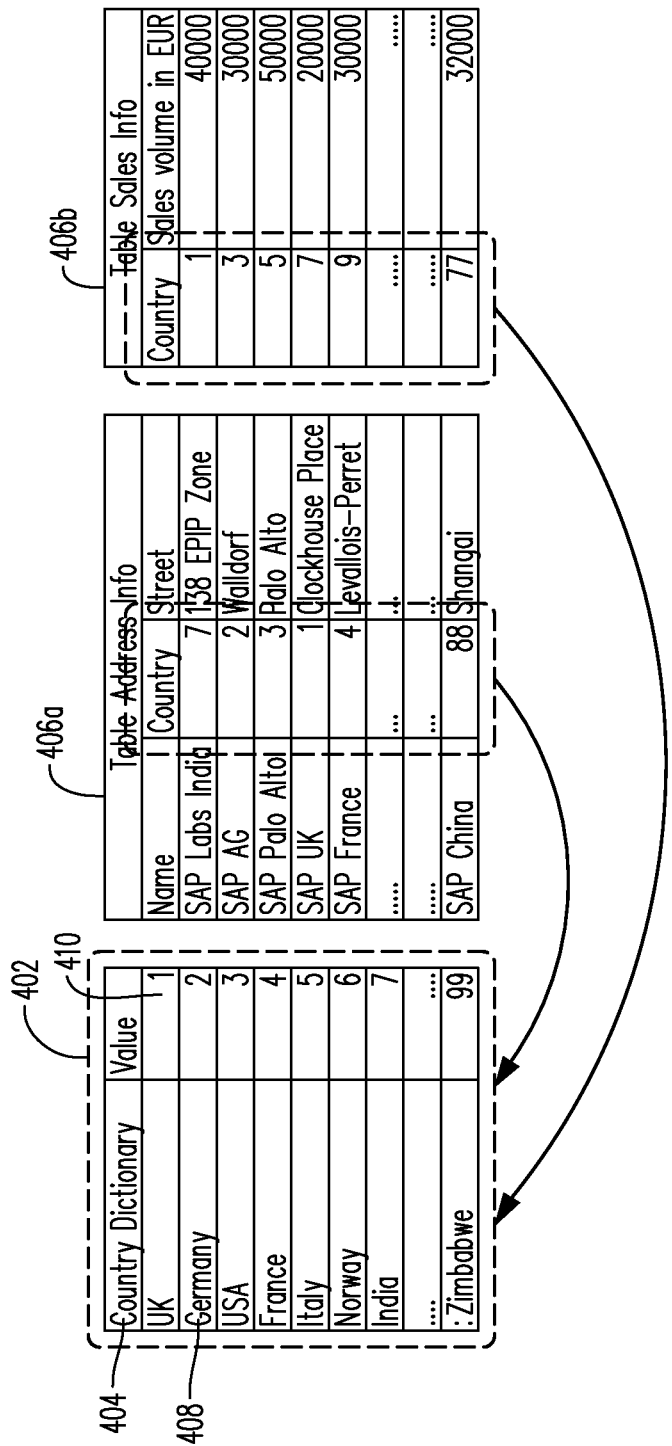
FIG. 4 includes tables according to some embodiments.

As a non-exhaustive example, the common dictionary 402 shown in FIG. 4, includes a common dictionary type 404 defined as "Country." As described above, the common dictionary 402 may be generated for a single field. The "Country" dictionary type 404 may be defined to include the following characteristics: a data type of string, having size 30 characters. The common dictionary 402 includes the following data values 408: UK, Germany, USA, France, Italy, Norway, India . . . Zimbabwe.

Then, in S318, the dictionary type 404 may be compressed by any suitable compression process. One non-exhaustive example of a compression process may be dictionary compression whereby distinct column values may be mapped to consecutive numbers or some other notation, so that instead of the actual value being stored, the typically much smaller consecutive number is stored. Continuing with the non-exhaustive example shown in FIG. 4, each of the data values 408 (UK, Germany, USA, France, Italy, Norway, India . . . Zimbabwe) in the dictionary type "Country" may be mapped to a compressed or assigned value 410. As used herein, the terms "compressed value" and "assigned value" maybe used interchangeably. As shown in FIG. 4, the data value "UK" is mapped to the compressed value "1;" the data value "Germany" is mapped to the compressed value "2;" the data value "USA" is mapped to the compressed value "3," etc. It is noted that the compression, in one or more embodiments, is applied to the dictionary type itself, and not on a column. Conventionally, an implicit dictionary may be created for each column and compression will be applied to the implicit dictionary created. Conventionally, the column will contain only the coded value when dictionary compression is used, and therefore compression may not be applied to the column directly. In one or more embodiments, each data value in the dictionary that was compressed resulting in the compressed value may be further compressed using at least one additional compression process, including but not limited to, prefix encoding, run length encoding (RLE), cluster encoding, sparse encoding and indirect encoding. A compression determination process may be used to determine which type of compression process is most appropriate for a given column.

The common dictionary 402 is generated in S320 based on the compressed dictionary type. It is noted that the common dictionary 402 may be used with any column-store database or row-store database where values are not directly stored, but instead use a compression process.

Following the generation of the common dictionary 402, a definition for a data storage table is created in S322. In S322 each column in the database table may be defined, and at least one of the column definitions may reference the common dictionary type 404. As used herein, the phrases "data storage table" and "database table" may be used interchangeably.

Figure 5:
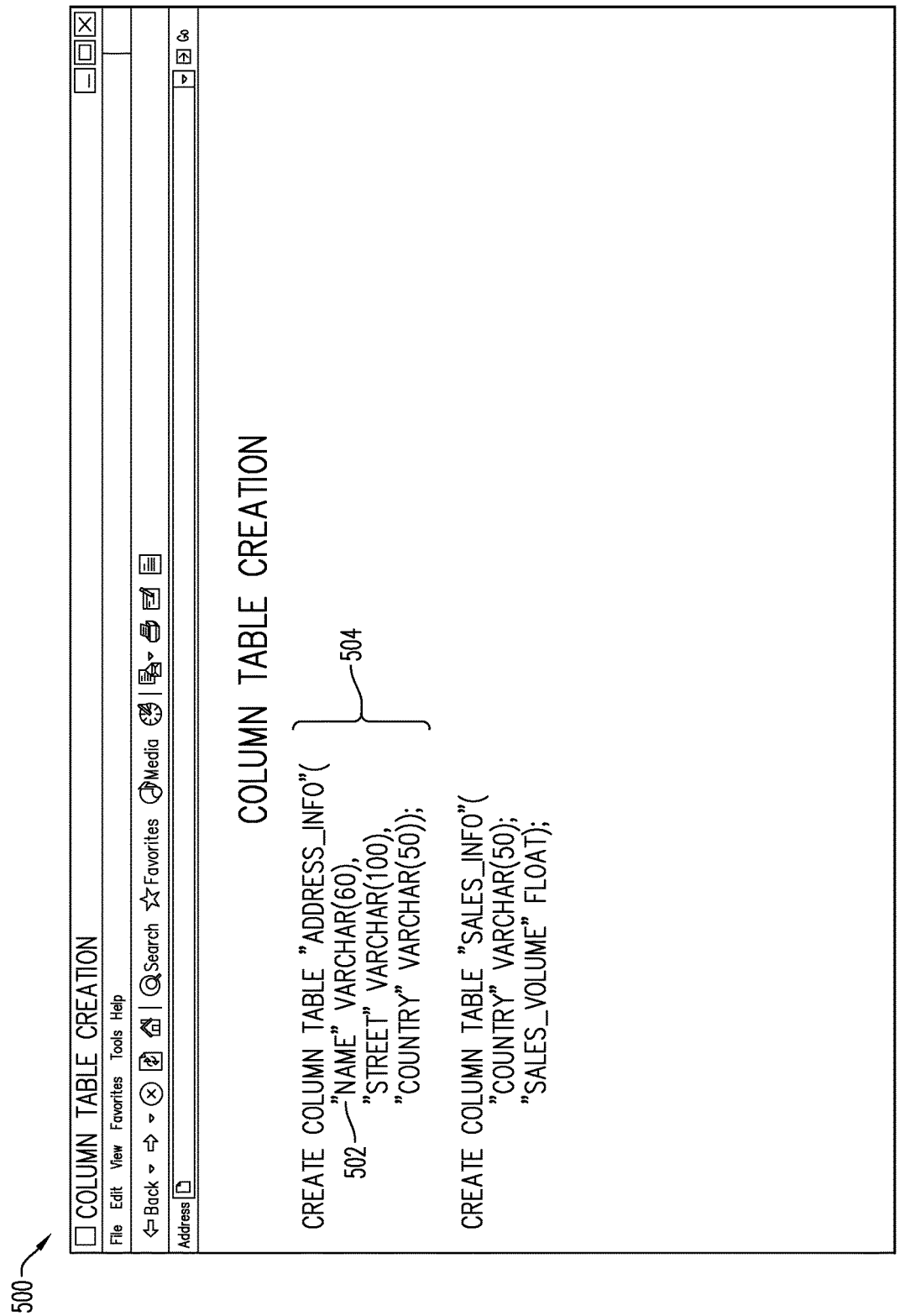
FIG. 5 is a prior art user interface.

FIG. 5 shows a user interface 500 including prior art definitions for the creation of two column tables in the database: 1. An "Address Info" column table and 2. A "Sales Info" column table, as shown in FIG. 2. Typically, the columns in the table are defined by including a field name 502 for the column (e.g., "Name") and characteristics 504 for the column (e.g. data type (e.g., variable characters, float values) and size, etc.).

In FIG. 5, for the "Address Info" table, a first column of the table is defined by including the field name 502 "Name." The "Name" column is further defined with characteristics 504 such that the "Name" column may receive variable characters with a maximum size of 60 characters. A second column of the table is defined by including the field name 502 "Street." The "Street" column is further defined with characteristics 504 such that the "Street" column may receive variable characters with a maximum size of 100 characters. A third column of the table is defined by including the field name 502 "Country." The "Country" column is further defined with characteristics 504 such that the "Country" column may receive variable characters with a maximum size of 50 characters.

In FIG. 5, for the "Sales Info" table, a first column of the table is defined by including the field name 502 "Country." The "Country" column is further defined with characteristics 504 such that the "Country" column may receive variable characters with a maximum size of 50 characters. A second column of the table is defined by including the field name 502 "Sales_Volume." The "Sales_Volume" column is further defined with characteristics 504 such that the "Sales_Volume" column may receive a floating value.

Figure 6:
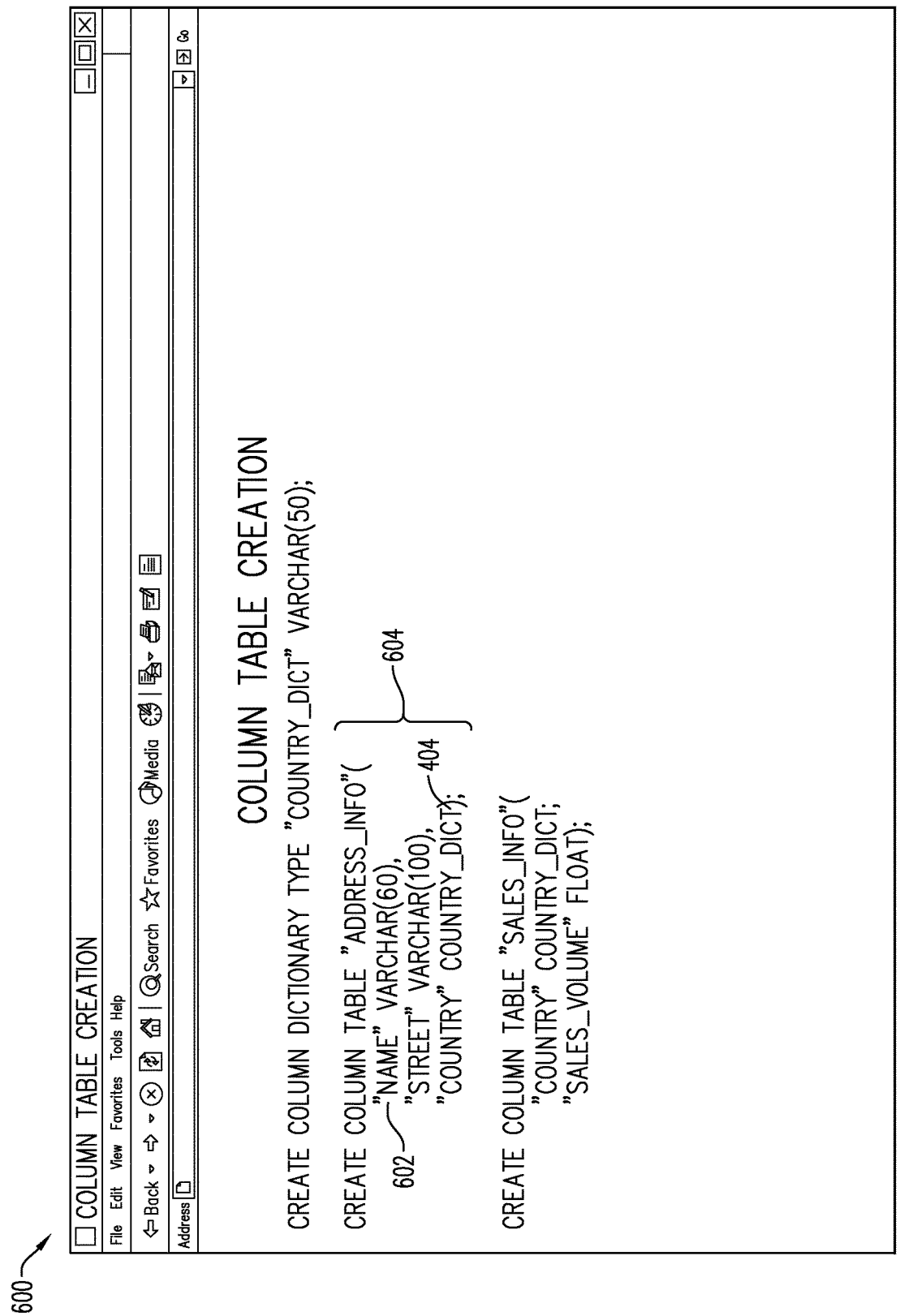
FIG. 6 is a user interface according to some embodiments.

In contrast, according to one or more embodiments, FIG. 6 shows a user interface 600 including definitions for the creation, according to one or more embodiments, of two column tables in the database: 1. An "Address Info" column table 406a and 2. A "Sales Info" column table 406b, as shown in FIG. 4. The columns in the table are defined by including a field name 602 for the column (e.g., "Name") and characteristics 604 for the column, where, in addition to data type and size, etc., dictionary type 404 may also be one of the characteristics. In one or more embodiments, properties or characteristics (e.g., type, size and other properties) may be derived from the dictionary type 404. In the non-exhaustive example shown in FIG. 6, according to one or more embodiments, for the "ADDRESS_INFO" table, the "Country" field name 602 column is further defined with characteristics 604 of the common dictionary type 404 "COUNTRY_DICT." For example, the common dictionary type 404 "COUNTRY_DICT" may have been defined with a particular data type (e.g., variable characters) and size (e.g., 30), such that just including the common dictionary type in the column creation imparts those characteristics to the column. Similarly, for the "SALES_INFO" table, the Country" field name 602 column is further defined with characteristic 604 of common dictionary type 404 "COUNTRY_DICT." The definitions for both "ADDRESS_INFO" table 406a and the "SALES_INFO" table 406b reference the common dictionary 404 "COUNTRY." One or more embodiments, provide an additional option to be chosen in the column definition to use the same dictionary storage as the dictionary type. While this option may not be needed if the dictionary and database table are created as shown in FIG. 6, some databases may provide an additional option, via a user interface (UI), to create a table. In that case, the database may offer a way to create the dictionary type and choose the dictionary type while defining a table column, in the UI.

It is noted that the definitions provided in FIGS. 5 and 6 are only indicative. The actual implementation may choose different syntax in defining the dictionary and consuming the dictionary type.

After the database tables 406 have been defined in S322, an application 735 may be executed, and one or more data values stored in the data storage tables may be requested in S324. The common dictionary type 404 is identified in S326 as a source for the requested one or more data values. The one or more data values are then retrieved in S328 from the common dictionary, and returned to the application in S330. In one or more embodiments, the retrieved one or more data values may be further manipulated prior to being returned to the application. For example, a calculation may be performed, or particular formatting may be applied.

Figure 7:
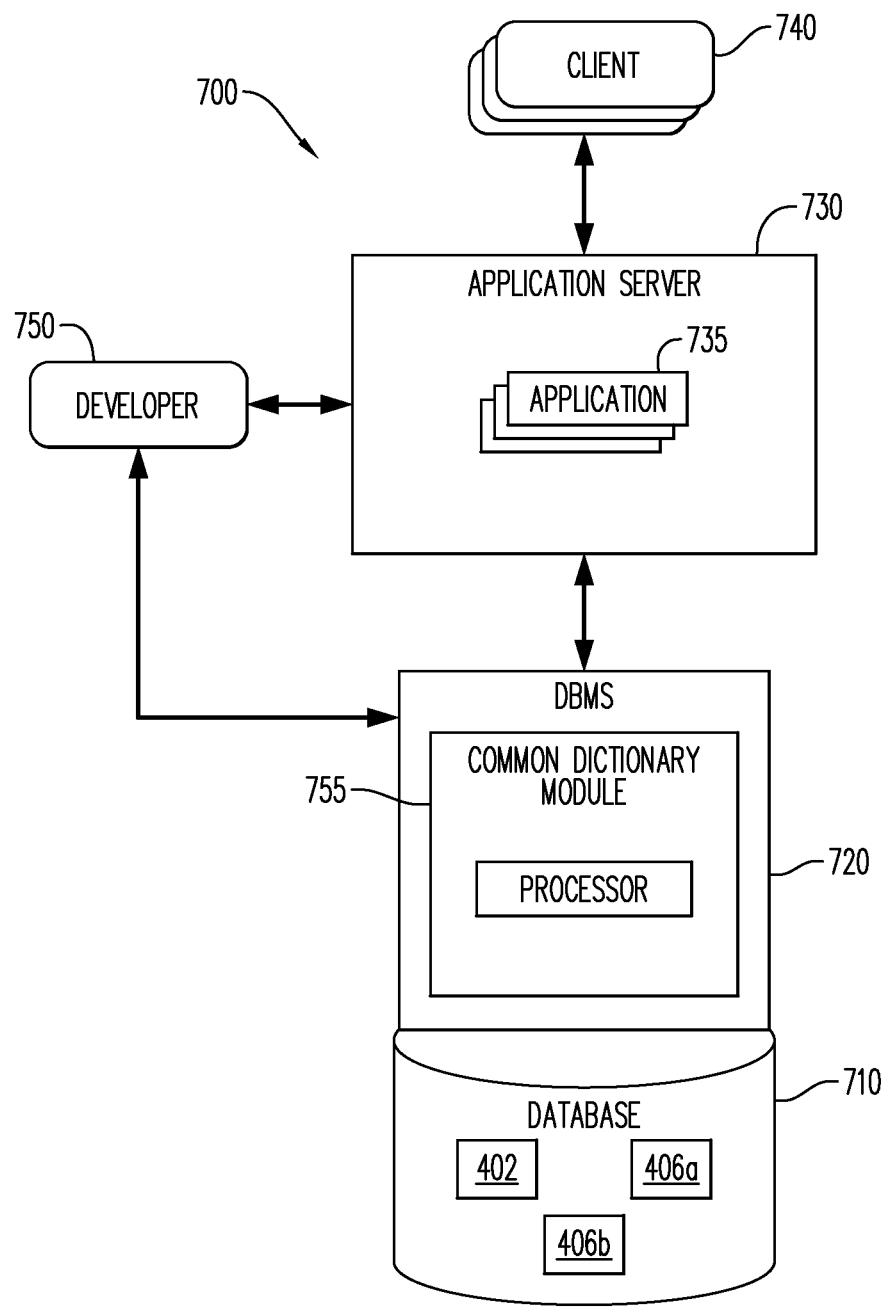
FIG. 7 is a block diagram of a system architecture according to some embodiments.

FIG. 7 is a block diagram of system architecture 700 according to some embodiments. Embodiments are not limited to architecture 700 or to a three-tier database architecture.

Architecture 700 includes database 710, database management system or service (DBMS) 720, application server 730, applications 735, client 740, a developer 750, and a common dictionary module 755. Applications 735 may comprise server-side executable program code (e.g., compiled code, scripts, etc.) executing within application server 730 to receive queries from clients 740 and provide results to clients 740 based on data of database 710 per the DBMS 720. In one or more embodiments, a developer 550 or client 540 may access the common dictionary module 755 to generate a common dictionary and generate one or more database tables for storage in the database.

Application server 730 provides any suitable interfaces through which clients 740 and developer 750 may communicate with the common dictionary module 755 or applications 735 executing on application server 730. It is noted that while the common dictionary module 755 is shown in the DBMS, in other embodiments the common dictionary module 755 may be in the application server 730. It is also noted that the developer/user may directly interact with the DBMS 720, and it is not necessary for them to interact with the DBMS via an application server. For example, application server 730 may include a HyperText Transfer Protocol (HTTP) interface supporting a transient request/response protocol over Transmission Control Protocol/Internet Protocol (TCP/IP), a Web Socket interface supporting non-transient full-duplex communications which implement the Web Socket protocol over a single TCP/IP connection, and/or an Open Data Protocol (OData) interface.

One or more applications 735 executing on server 730 may communicate with DBMS 720 using database management interfaces such as, but not limited to, Open Database Connectivity (ODBC) and Java Database Connectivity (JDBC) interfaces. These types of applications 735 may use Structured Query Language (SQL) to manage and query data stored in database 710.

DBMS 720 serves requests to retrieve and/or modify data of database 710, and also performs administrative and management functions. Such functions may include snapshot and backup management, indexing, optimization, garbage collection, and/or any other database functions that are or become known. DBMS 720 may also provide application logic, such as database procedures and/or calculations, according to some embodiments. This application logic may comprise scripts, functional libraries and/or compiled program code.

Application server 730 may be separated from, or closely integrated with, DBMS 720. A closely-integrated application server 730 may enable execution of server applications 735 completely on the database platform, without the need for an additional application server. For example, according to some embodiments, application server 730 provides a comprehensive set of embedded services which provide end-to-end support for Web-based applications. The services may include a lightweight web server, configurable support for OData, server-side JavaScript execution and access to SQL and SQLScript.

Application server 730 may provide application services (e.g., via functional libraries) which applications 735 may use to manage and query the data of database 710. The application services can be used to expose the database data model, with its tables, hierarchies, views and database procedures, to clients. In addition to exposing the data model, application server 730 may host system services such as a search service.

Database 710 may store data used by at least one of: applications 735 and the common dictionary module 755. For example, database 710 may store data values that may be used by the common dictionary module 755 during the execution thereof.

Database 710 may comprise any query-responsive data source or sources that are or become known, including but not limited to a structured-query language (SQL) relational database management system. Database 710 may comprise a relational database, a multi-dimensional database, an eXtendable Markup Language (XML) document, or any other data storage system storing structured and/or unstructured data. The data of database 710 may be distributed among several relational databases, dimensional databases, and/or other data sources. Embodiments are not limited to any number or types of data sources.

In some embodiments, the data of database 710 may comprise one or more of conventional tabular data, row-based data, column-based data, and object-based data. Moreover, the data may be indexed and/or selectively replicated in an index to allow fast searching and retrieval thereof. Database 710 may support multi-tenancy to separately support multiple unrelated clients by providing multiple logical database systems which are programmatically isolated from one another.

Database 710 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Developer 750 and Client 740 may comprise one or more individuals or devices executing program code of a software application for presenting and/or generating user interfaces to allow interaction with application server 730 and the database 710. Presentation of a user interface as described herein may comprise any degree or type of rendering, depending on the type of user interface code generated by application server 730.

For example, a client 740 may execute a Web Browser to request and receive a Web page (e.g., in HTML format) from a website application 735 of application server 730 via HTTP, HTTPS, and/or Web Socket, and may render and present the Web page according to known protocols. The client 740 may also or alternatively present user interfaces by executing a standalone executable file (e.g., an .exe file) or code (e.g., a JAVA applet) within a virtual machine.

Figure 8:
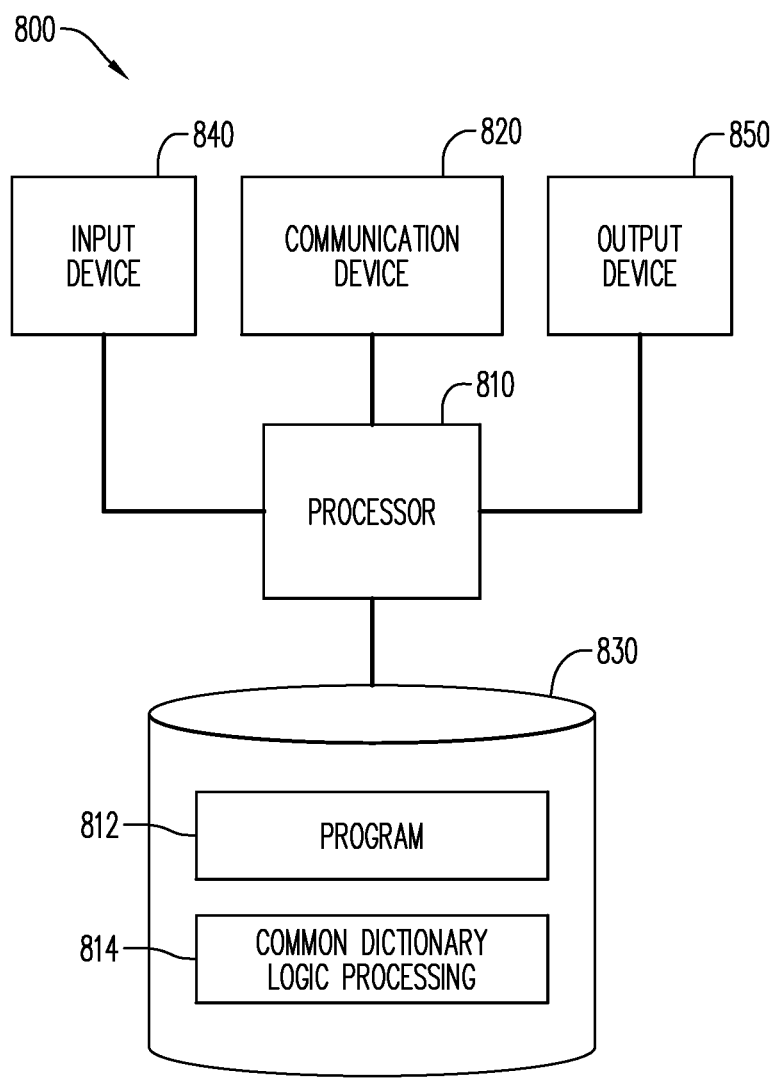
FIG. 8 is a block diagram of a system according to some embodiments.

FIG. 8 is a block diagram of apparatus 800 according to some embodiments. Apparatus 800 may comprise a general- or special-purpose computing apparatus and may execute program code to perform any of the functions described herein. Apparatus 800 may comprise an implementation of one or more elements of system 700. Apparatus 800 may include other unshown elements according to some embodiments.

Apparatus 800 includes a common dictionary processor 810 operatively coupled to communication device 820, data storage device 830, one or more input devices 840, one or more output devices 850 and memory 860. Communication device 820 may facilitate communication with external devices, such as application server 730. Input device(s) 840 may comprise, for example, a keyboard, a keypad, a mouse or other pointing device, a microphone, knob or a switch, an infra-red (IR) port, a docking station, and/or a touch screen. Input device(s) 840 may be used, for example, to manipulate graphical user interfaces and to input information into apparatus 800. Output device(s) 850 may comprise, for example, a display (e.g., a display screen) a speaker, and/or a printer.

Data storage device/memory 830 may comprise any device, including combinations of magnetic storage devices (e.g., magnetic tape, hard disk drives and flash memory), optical storage devices, Read Only Memory (ROM) devices, Random Access Memory (RAM) etc.

The storage device 830 stores a program 812 and/or common dictionary platform logic 814 for controlling the processor 810. It is noted that program 812 and/or common dictionary platform logic 814 may also be stored and executed from an application server or from any other environment that can execute software instructions. The processor 810 performs instructions of the programs 812, 814, and thereby operates in accordance with any of the embodiments described herein, including but not limited to process 300.

The programs 812, 814 may be stored in a compressed, uncompiled and/or encrypted format. The programs 812, 814 may furthermore include other program elements, such as an operating system, a database management system, and/or device drivers used by the processor 810 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices may be located remotely from one another and may communicate with one another via any known manner of network(s) and/or a dedicated connection. Each computing device may comprise any number of hardware and/or software elements suitable to provide the functions described herein as well as any other functions. For example, any computing device used in an implementation of system 700 may include a processor to execute program code such that the computing device operates as described herein.

All systems and processes discussed herein may be embodied in program code stored on one or more computer-readable non-transitory media. Such non-transitory media may include, for example, a fixed disk, a floppy disk, a CD-ROM, a DVD-ROM, a Flash drive, magnetic tape, and solid-state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A system comprising:
a common dictionary module;
a common dictionary processor in communication with the common dictionary module and operative to execute processor-executable process steps to cause the system to:
define a common dictionary type, wherein the common dictionary type is a category of data values;
assign one or more characteristics to the common dictionary type, wherein the one or more characteristics include data type, size, unique indicator and a list of possible value ranges;
receive one or more data values of the category of data values;
compress the common dictionary type, wherein the compressed common dictionary type defines a structure for data values stored in a data storage table based on the one or more characteristics assigned to the common dictionary type, wherein the compressed common dictionary type imparts the assigned one or more characteristics of the common dictionary type to the data storage table definition that references the compressed common dictionary type for a table; and
generate a common dictionary based on the compressed dictionary type, wherein the common dictionary is accessible by two or more data storage tables;
create, based on the common dictionary via an option of a graphical user interface, the data storage table definition on the graphical user interface, wherein the data storage table definition includes the compressed dictionary type and the assigned one or more characteristics;
receive a request for the one or more data values from at least one application;
identify the common dictionary type as a source of the one or more data values;
retrieve the one or more data values from the common dictionary;
manipulate the retrieved one or more data values; and
return the manipulated retrieved one or more data values to the at least one application.

2. The system of claim 1, wherein the two or more data storage tables are each a column store.

3. The system of claim 1, wherein the common dictionary type is a data object.

4. The system of 1, further comprising an in-memory data storage.

5. The system of claim 1, further comprising processor-executable process steps to cause the system to: execute a second compression process with respect to compressed data in the common dictionary.

6. The system of claim 1 wherein the one or more characteristics include decimals, a label or description, nullable indicator, and encoding.

7. A computer-implemented method comprising:
defining, by a processor, a common dictionary type, wherein the common dictionary type is a category of data values;
assigning, by the processor, one or more characteristics to the common dictionary type, wherein the one or more characteristics include data type, size, unique indicator and a list of possible value ranges;
receiving, by the processor, one or more data values of the category of data values,
compressing, by the processor, the common dictionary type, wherein the compressed common dictionary type defines a structure for data values stored in a data storage table based on the one or more characteristics assigned to the common dictionary type, wherein the compressed common dictionary type imparts the assigned one or more characteristics of the common dictionary type to the data storage table definition that references the compressed common dictionary type for a table;
generating, by the processor, a common dictionary based on the compressed dictionary type, wherein the common dictionary is accessible by two or more data storage tables;
creating, based on the common dictionary via an option of a graphical user interface, the data storage table definition on the graphical user interface, wherein the data storage table definition includes the compressed dictionary type and the assigned one or more characteristics;
receiving a request for the one or more data values from at least one application;
identifying the common dictionary type as a source of the one or more data values;
retrieving the one or more data values from the common dictionary;
manipulating the retrieved one or more data values; and
returning the manipulated retrieved one or more data values to the at least one application.

8. The method of claim 7, wherein the two or more data storage tables are each a column store.

9. The method of claim 7, further comprising: executing a second compression process with respect to compressed data in the common dictionary.

10. The method of claim 7 wherein the one or more characteristics include decimals, a label or description, nullable indicator, and encoding.

11. A non-transitory computer-readable medium storing program code, the program code executable by a computer system to cause the computer system to:
define a common dictionary type, wherein the common dictionary type is a category of data values;

assign one or more characteristics to the common dictionary type, wherein the one or more characteristics include data type, size, unique indicator and a list of possible value ranges;

receive one or more data values of the category of data values;

compress the common dictionary type, wherein the compressed common dictionary type defines a structure for data values stored in a data storage table based on the one or more characteristics assigned to the common dictionary type, wherein the compressed common dictionary type imparts the assigned one or more characteristics of the common dictionary type to the data storage table definition that references the compressed common dictionary type for a table;

generate a common dictionary based on the compressed dictionary type, wherein the common dictionary is accessible by two or more data storage tables;

create, based on the common dictionary via an option of a graphical user interface, the data storage table definition on the graphical user interface, wherein the data storage table definition includes the compressed dictionary type and the assigned one or more characteristics;

receive a request for the one or more data values from at least one application;

identify the common dictionary type as a source of the one or more data values;

retrieve the one or more data values from the common dictionary;

manipulate the retrieved one or more data values; and return the manipulated retrieved one or more data values to the at least one application.

\* \* \* \* \*